United States Patent [19]

Chiu

[11] Patent Number: 5,353,738
[45] Date of Patent: Oct. 11, 1994

[54] PET CAGE

[76] Inventor: Hsien-Yao Chiu, No. 14, Alley 11, Lane 25, Ching Li St., Tu Chen Hsiang, Taipei Hsien, Taiwan

[21] Appl. No.: 20,679

[22] Filed: Feb. 22, 1993

[51] Int. Cl.⁵ .............................................. A01K 31/08
[52] U.S. Cl. ....................................... 119/17; 446/126
[58] Field of Search ................... 119/17, 19; 446/108, 446/110, 111, 112, 113, 114, 115, 122, 126

[56] References Cited

U.S. PATENT DOCUMENTS

| | | | |
|---|---|---|---|
| 2,936,530 | 5/1960 | Bowen | 446/126 |
| 4,084,344 | 4/1978 | Asano | 446/126 |
| 4,901,672 | 2/1990 | Rosenberger | 119/19 |
| 5,000,121 | 3/1991 | Daily | 119/17 |
| 5,048,460 | 9/1991 | Sheaffer | 119/19 |

FOREIGN PATENT DOCUMENTS 436027 3/1912 France .................. 119/17

*Primary Examiner*—Gene Mancene
*Assistant Examiner*—Todd E. Manahan
*Attorney, Agent, or Firm*—Raymond Sun

[57] ABSTRACT

A pet cage includes a left grid, a right grid, a front grid with a door, a rear grid, a bottom grid, a top grid, and four connecting post units each with a caster provided at a bottom end thereof. Each post unit is substantially a plurality of aligned tubular meanders interconnected by a connecting member. The connecting member is substantially a base block with two engaging protrusions respectively projecting from top and bottom surface thereof and a third engaging protrusion projecting from a side surface thereof. The two protrusions respectively engage with a tubular member. The third protrusion engages with the right grid (or the left grid) and a recess formed in the base block receives an engaging end of a front grid (or a rear grid). The base block has a countersink in the other side which is opposite to the side in which the recess is formed. The countersink communicates with the recess and receives a countersink bolt which engages with a threaded hole in the engaging end of the front and rear grids to secure all grids together to form a cage. Each post unit has a topmost connecting member which has a structure substantially the same as that of the connecting member except that the topmost connecting member does not have the protrusion extending from an upper side thereof.

2 Claims, 7 Drawing Sheets 5,353,738

PET CAGE

BACKGROUND OF THE INVENTION

The present invention relates to a pet cage and, more particularly, to a pet cage which can be disassembled and has improved connecting means to avoid potential injury to persons.

Pet cages are widely-used articles. The pet cages are usually disassembled for transportation as they are bulky. The connecting means used in the pet cages, however, tend to cause injury to persons. The present invention provides a pet cage with improved connecting means to mitigate and/or obviate the drawback mentioned in the above.

SUMMARY OF THE INVENTION

A pet cage in accordance with the present invention generally includes a left grid, a right grid, a front grid with a door, a rear grid, a bottom grid, a top grid, and four connecting post means each with a caster provided at a bottom end thereof.

The connecting post means is substantially a plurality of aligned tubular members interconnected by a connecting member. The connecting member is substantially a base block with two engaging protrusions respectively projecting from top and bottom surfaces thereof and a third engaging protrusion projecting from a side surface thereof. The two first-mentioned protrusions respectively engage with a tubular member. The third protrusion engages with the right grid (or the left grid) and a recess formed in the base block receives an engaging end of a front grid (or a rear grid). The base block has a countersink in the other side which is opposite to the side in which the recess is formed. The countersink communicates with the recess and receives a countersink bolt which engages with a threaded hole in the engaging end of the front and rear grids to secure all grids together to form a cage. The topmost connecting member has a structure substantially the same as that of the connecting member except that the topmost connecting member does not have protrusion extending from an upper side thereof.

According to another aspect of the present invention, the top grid consists of two grid sections. A pivotal block is pivotally mounted to a topmost member of the right and left grids. The pivotal block is substantially hollow for receiving the side member of the grid sections and allows the grid sections to slide in it. A countersink is formed in the topmost member for receiving a countersink bolt which engages with the pivotal block, thereby allowing pivotal movement of the grid sections and associated pivotal blocks. By such an arrangement, the top grid is openable, and when the top grid is opened, a perch is provided between the grid sections to allow birds to stand thereon. A stop projects from each post means to support the grid sections when the top grid is opened.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
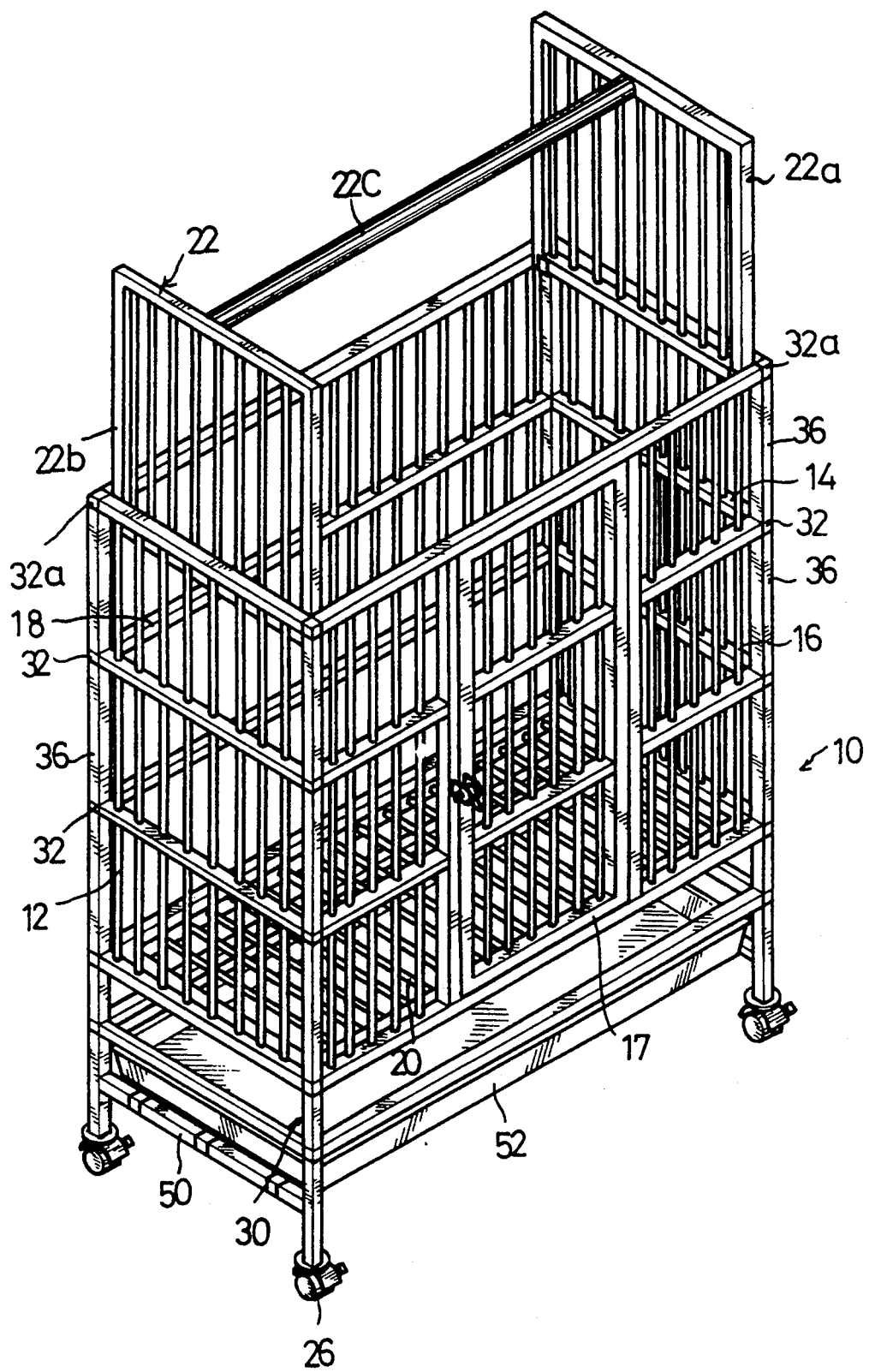
FIG. 1 is a perspective view of a pet cage in accordance with the present invention.

Referring to the drawings and initially to FIG. 1, a pet cage 10 in accordance with the present invention generally includes a left grid 12, a right grid 14, a front grid 16 with a door 17, a rear grid 18, a bottom grid 20, a top grid 22, and four connecting post means 30 each with a caster 26 provided at a bottom end thereof.

Figure 2:
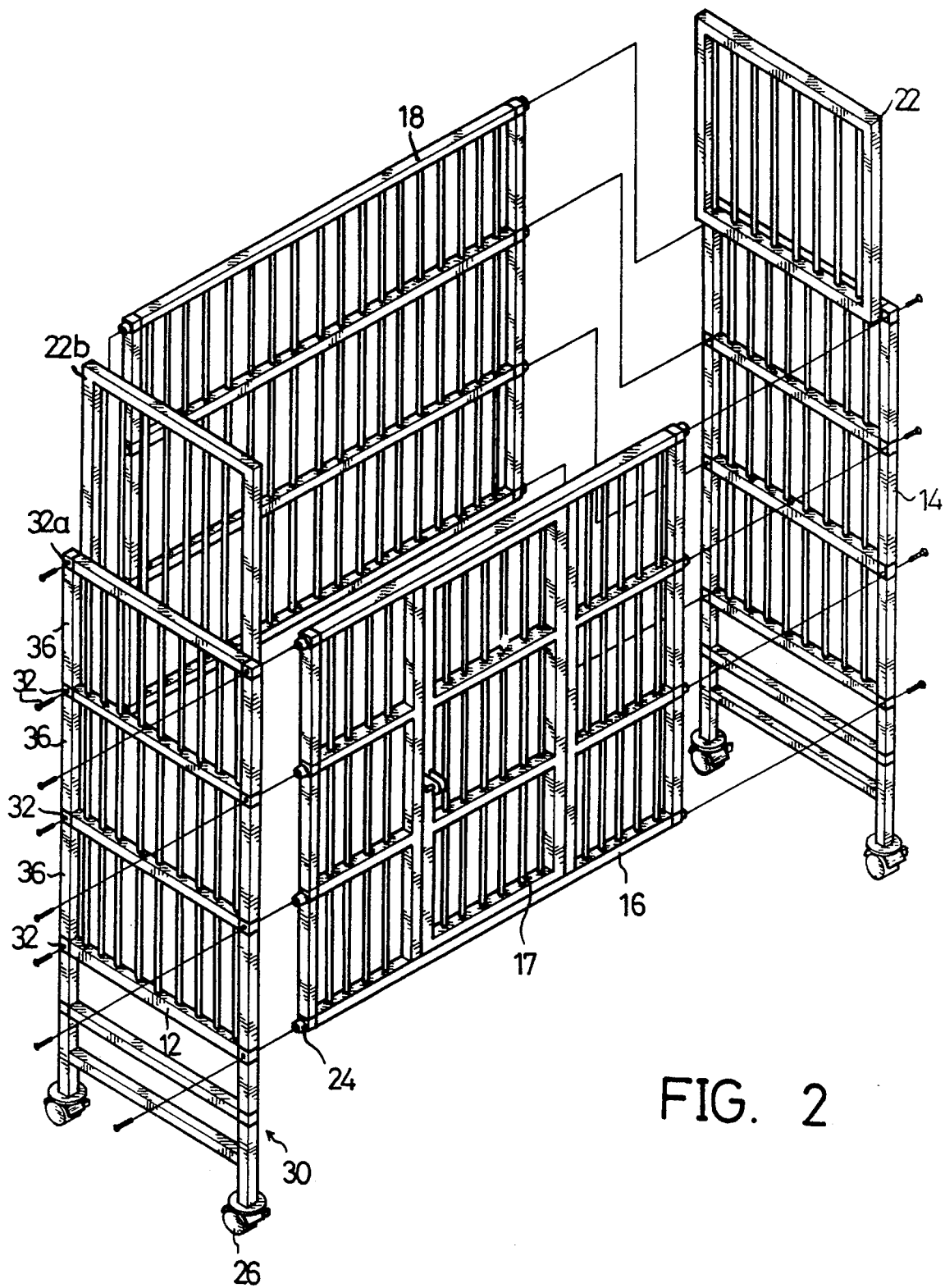
FIG. 2 is an exploded view of the pet cage in which the lower structure thereof is omitted for clarity.
Figure 3:
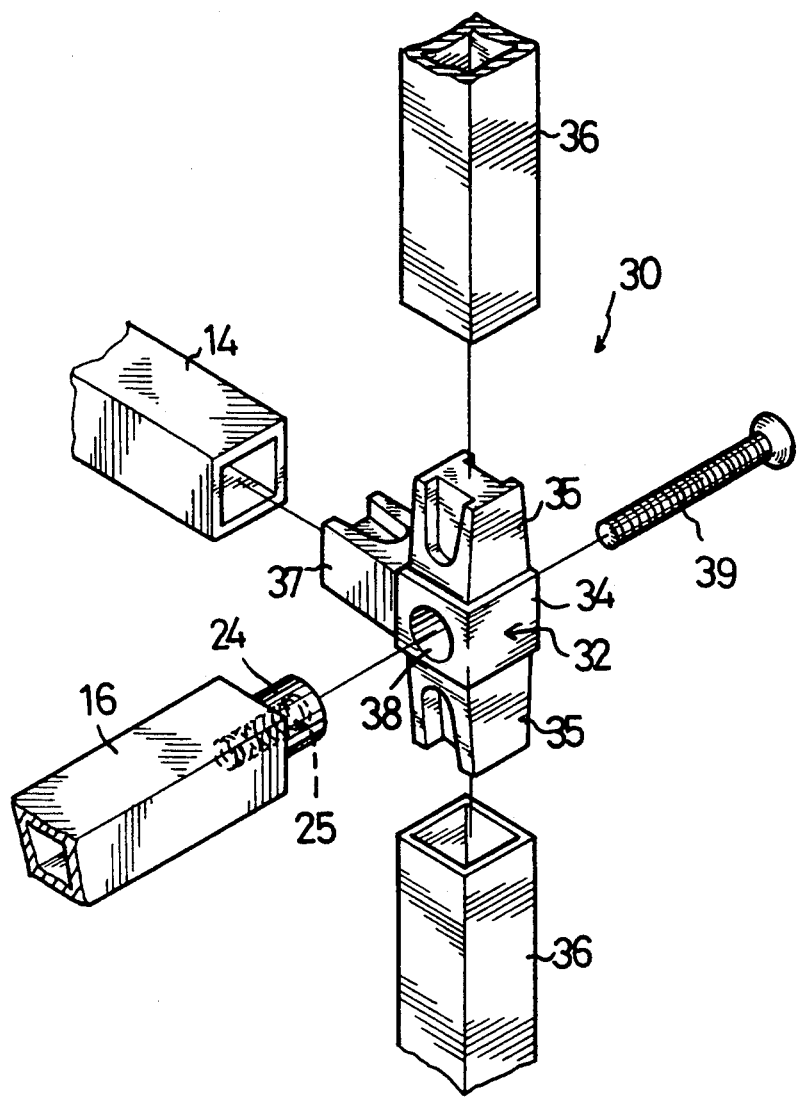
FIG. 3 is an exploded view showing a connecting means for connecting grids.
Figure 5:
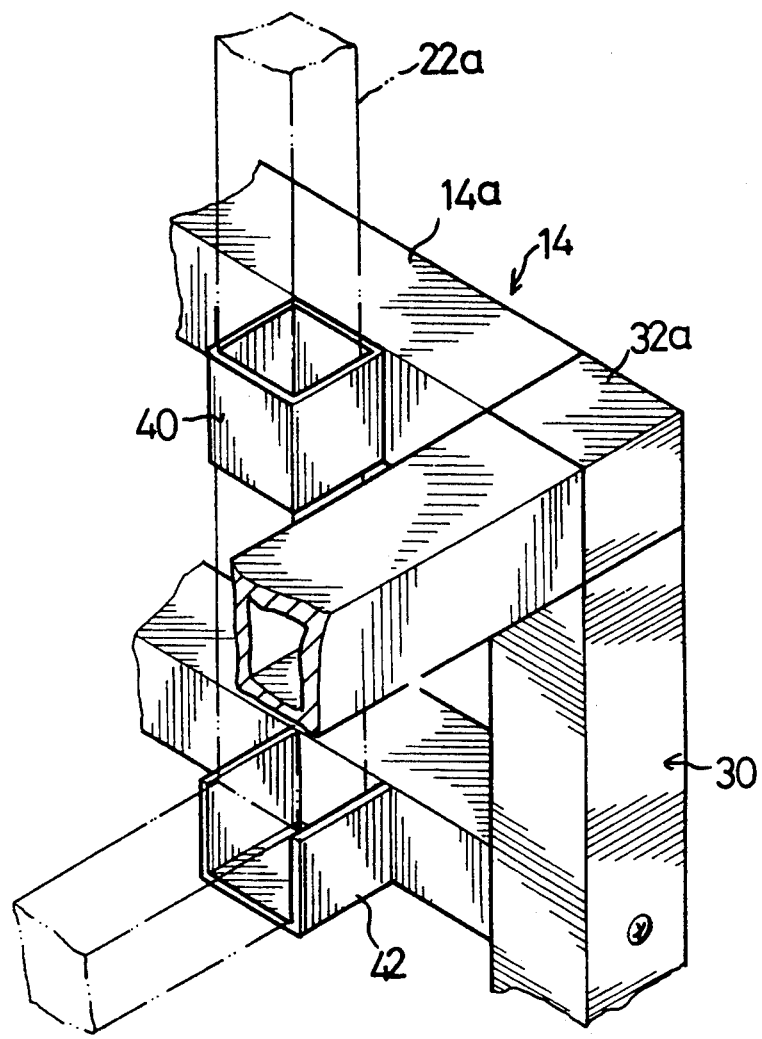
FIG. 5 is a schematic view showing operation of the top gate.
Figure 4:
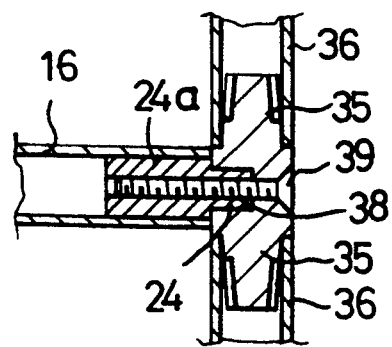
FIG. 4 is a cross-sectional view showing the engagement of the connecting means.
Figure 6:
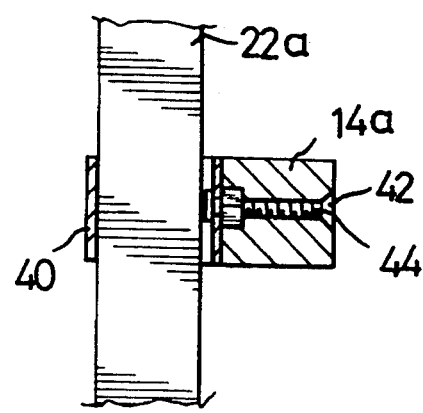
FIG. 6 is a cross-sectional view showing detailed structure for the pivotal block.

As shown in FIGS. 1 through 3, the connecting post means 30 is substantially a plurality of aligned tubular members 36 interconnected by a connecting member 32. In this embodiment, the connecting post means 30 is integral with the right and left grids 14 and 12 to provide a pet cage which can be rapidly assembled. The connecting member 32 is substantially a base block 34 with two engaging protrusions 35 respectively projecting from top and bottom surface thereof and a third engaging protrusion 37 projecting from a side surface thereof. The two protrusions 35 respectively engage with a tubular member 36. Protrusion 37 engages with the right grid 14 (or the left grid 12) and a recess 38 formed in the base block 34 receives an engaging end 24 of the front gird 16 (or the rear grid 18). Alternatively, protrusion 37 may engage with the front grid 16 and the rear grid 18, and the recess 38 in the base block 34 may receive an engaging end of the left grid 12 (or the right grid 14). As shown in FIG. 4, the base block 34 has a countersink 39 in the other side which is opposite to the side in which the recess 38 is formed. The countersink 39 communicates with the recess 38 and receives a countersink bolt 40 which engages with a threaded hole 25 in the engaging end 24 of the grid 16 to secure the grids together. In this embodiment, a cylinder block 24a is inserted into the grid 16 with its engaging end 24 exposed outside to perform its function. The topmost connecting member 32a has a structure substantially the same as that of the connecting member 32 except that the topmost connecting member 32a does not have protrusion 35 extending from an upper side thereof, FIG. 5 shows an operation of the top grid 22. In FIG. 1, the top grid 22 which consists of two grid sections 22a and 22b are opened with a perch 22c mounted therebetween on which a parrot or other birds may stand. Referring to FIGS. 5 and 6, a pivotal block 40 is pivotally mounted to a topmost horizontally-extending member 14a of the right and left grids 14 and 12 (only one block is shown). The pivotal block 40 is substantially hollow for receiving the side member of the grid sections 22a, 22b and allows the grid sections 22a, 22b to slide in it. As shown in FIG. 6, a countersink 44 is formed in the topmost member 14a for receiving a countersink bolt 44 which engages with the pivotal block 40, thereby allowing pivotal movement of the grid sections 22a, 22b and associated pivotal blocks 40. If the top grid 22 of the pet cage 10 is to be closed, the perch 22c is removed, and the grid sections 22a and 22b are moved upward and then the pivotal blocks 40 together with the grid portions 22a and 22b are pivoted through 90° to form a closed top grid 22. For opening the top grid 22, the grid portions 22a and 22b are lifted upward, pivoted outward, and then slid downward until they are stopped by a stop 42 projecting from the post means 30, by means of which the grid sections 22a and 22b may stand vertically.

Figure 7:
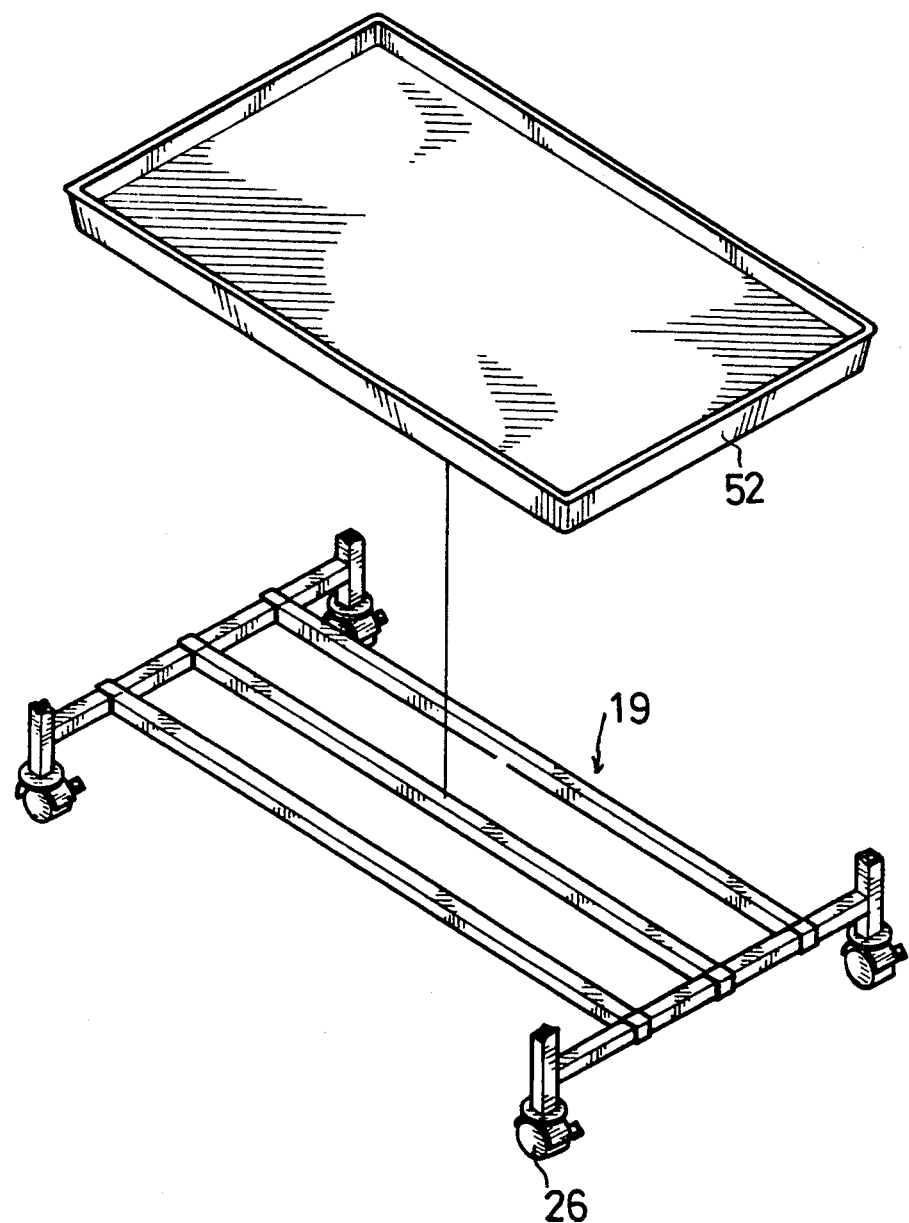
FIG. 7 is a schematic view showing lower structure of the pet cage.
Figure 8:
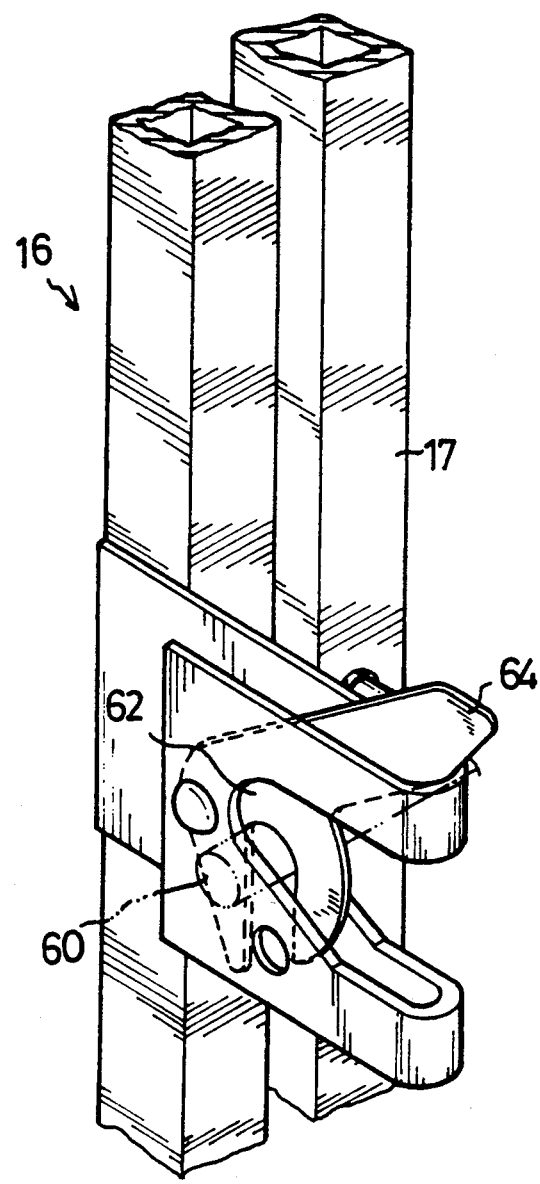
FIG. 8 is a schematic view showing the lock for the pet cage.

A plate 52 for receiving waste, such as excrement of the pet, is removably mounted on a base frame 19 which is provided below the bottom grid 20, as shown in FIG. 7. FIG. 8 shows a lock arrangement for pet cage. When the pet is to be moved into the cage, a pin 60 mounted to the door 17 impinges a hooked member 62 and causes a pivotal movement of the latter, which allows the pin 60 to pass through. Then, the hooked member 62 pivots to its original position and thus limits the pin 60. If the door 17 is to be opened, the hooked member 62 is impinged at a distal end 64 thereof and then open the door 17 as the pin 60 is free.

Although the invention has been explained in relation to its preferred embodiment, it is to be understood that many other possible modifications and variations can be made without departing from the spirit and scope of the invention as hereinafter claimed.

I claim:

1. A pet cage comprising two side grids, a front grid, a rear grid, a bottom grid, a top grid, a door in one of said side, front and rear grids and four connecting post means each with a caster provided at a bottom end thereof, each said connecting post means having a plurality of aligned tubular members, a top connecting means, and a plurality of connecting members said top connecting means having a base block with a first engaging protrusion projecting from a bottom surface of said base block for engaging with an associated one of said tubular member and a second engaging protrusion projecting from a side surface of said base block for engaging with one of said side grids, a recess being formed in a second side of said base block and extending perpendicular to said first and second engaging first and protrusions, said recess receiving an engaging end of one of said front and rear grids, said base block having a countersink in the other side which is opposite to said second side of said base block, said countersink communicating with said recess and receiving a countersink bolt which engages with a threaded hole in said engaging end of said front and rear grids;

each of said connecting members having a second base block with third and fourth engaging protrusions respectively projecting from bottom and top surfaces of said second base block for engaging with associated ones of said tubular members and a fifth engaging protrusion projecting from a side surface of said second base block for engaging with one of said side grids, a second recess being formed in a second side of said second base block and extending perpendicular to said third, fourth, and fifth engaging protrusion, said second recess receiving an engaging end of one of said front and rear grids, said second base block having a second countersink in the other side which is opposite to said second side of said second base block, said second countersink communicating with said second recess and receiving a second countersink bolt which engages with a second threaded hole in said engaging end of said front and rear grids.

2. The pet cage as claimed in claim 1 wherein said top grid consists of two grid sections, a pivotal block being pivotally mounted to a topmost member of said side grids, said pivotal block being substantially hollow for receiving a side member of said grid sections and allowing said grid sections to slide in it, a third countersink being formed in said topmost member for receiving a countersink bolt which engages with said pivotal block, thereby allowing pivotal movement of said grid sections and associated pivotal blocks relative to said side grids.

* * * * *